(No Model.)
J. F. REEDER.
PLOW SWEEP.
No. 513,417.
Patented Jan. 23, 1894.
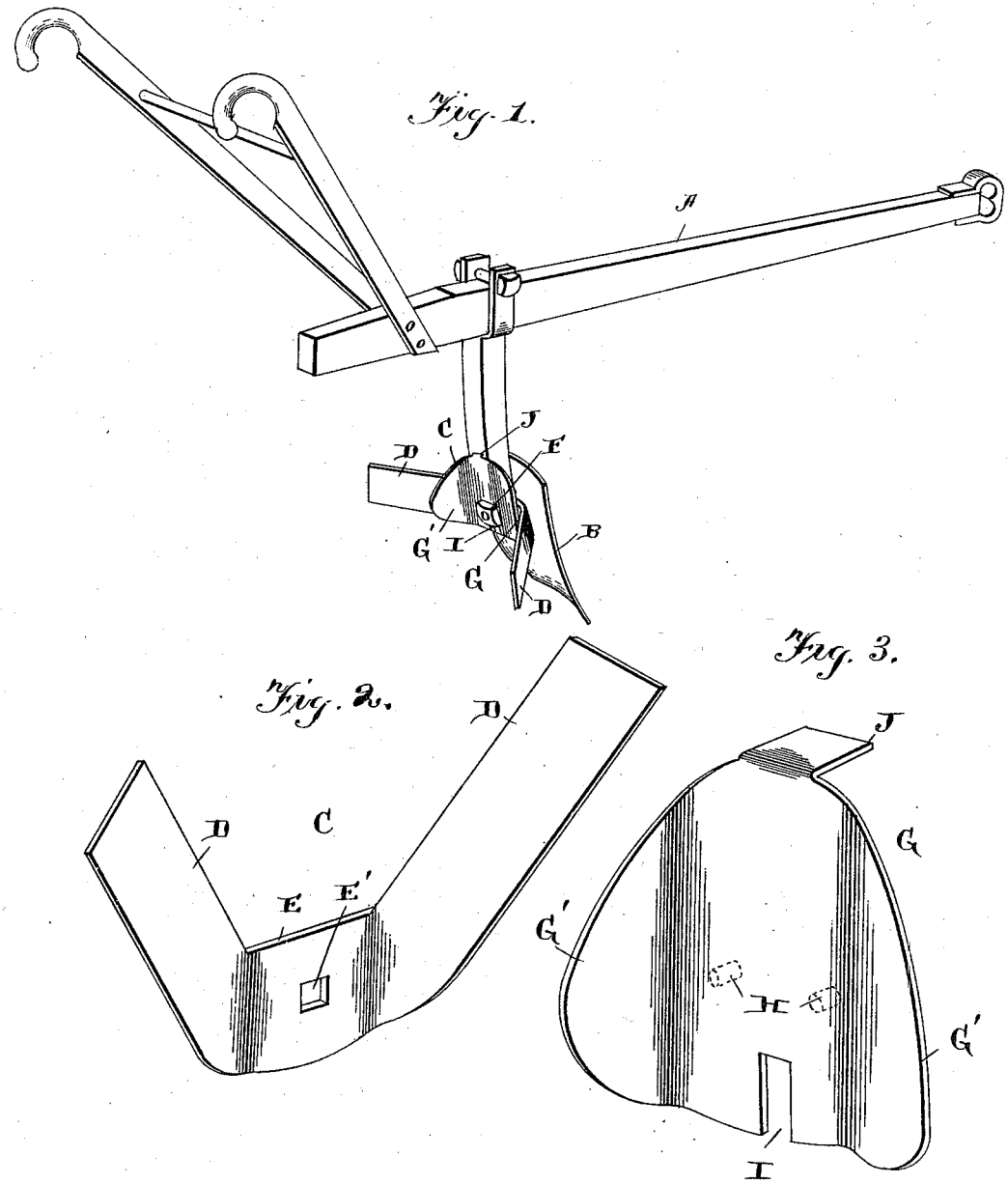
WITNESSES:
Geo. E. Frech.
G. M. Copenhaver.
INVENTOR
J. F. Reeder,
BY Lehmann Pattison & Kisch
ATTORNEYS
THE NATIONAL LITHOGRAPHING COMPANY,
WASHINGTON, D. C.

United States Patent Office.

JOHN F. REEDER, OF HAYNESVILLE, LOUISIANA.

PLOW-SWEEP.

SPECIFICATION forming part of Letters Patent No. 513,417, dated January 23, 1894.

Application filed November 4, 1893. Serial No. 490,030. (No model.)

*To all whom it may concern:*

Be it known that I, JOHN F. REEDER, of Haynesville, in the parish of Claiborne and State of Louisiana, have invented certain new and useful Improvements in Plow-Sweeps; and I do hereby declare the following to be a full, clear, and exact description of the invention, such as will enable others skilled in the art to which it pertains to make and use it, reference being had to the accompanying drawings, which form part of this specification.

My invention relates to an improved plow sweep; and the object of the same is to provide an improved form of sweep, and also an improved brace for holding the same in position.

Referring to the accompanying drawings:—
Figure 1, is a perspective view of a plow provided with my improved device. Figs. 2 and 3, are detached views of the sweep and support respectively.

A designates the plow stock and B the share secured to its lower end. Arranged behind the share and stock is a sweep C, which is formed of a single piece of metal having the downwardly and outwardly extending flared wings D, which are integral with the central portion E, perforated at E' to receive bolt F for clamping the sweep to the rear side of the plow stock. In order to hold said wings in their proper position and to prevent them from being bent inward toward each other, I provide the brace or support G, which consists of a plate of metal having its edges flared rearward, as shown at G', to accommodate itself to the shape of the sweep. By this arrangement it will be seen that the wings of the latter fit snugly in said flared edges. At the angles of the said brace I provide the studs H, against which the sweep bears when in position, thus holding it and the brace securely together, and the former from turning. The lower edge of the brace is provided with the elongated bolt opening I through which the clamping bolt F extends, and which opening enables me to adapt the plate to sweeps of different sizes, as will be readily understood. The upper edge of the brace plate is provided with the forwardly turned lug J which engages a recess in the plow stock, thus securely holding the brace and sweep and adding a further precaution against turning.

By means of the arrangement herein shown and described it will be seen that it is quite impossible for the wings of the sweep to close together when subjected to pressure as the said plate effectually braces them and holds the same in proper position.

Having thus described my invention, what I claim, and desire to secure by Letters Patent, is—

1. An improved plow sweep comprising integral oppositely extending wings, a brace plate arranged behind said wings, and a means for securing the plate and wings in position, substantially as shown and described.

2. An improved sweep comprising rearwardly flared oppositely extending integral wings, a plate arranged behind the same having flared sides to correspond with the said wings, and a means for clamping the plate and sweep to a plow stock, substantially as shown and described.

3. An improved sweep comprising oppositely extending and rearwardly flared wings, a plate arranged behind the same having its sides flared to correspond with the said wings, and stops arranged at the angles of said plate against which the sweep bears, substantially as shown and described.

4. An improved sweep comprising oppositely extending wings, a central portion for connecting the same having a bolt opening, a plate arranged behind the wings for bracing and supporting the same, the said plate being provided with an elongated slot at its lower edge, and a securing bolt adapted to extend through said slot and the perforation in the sweep, substantially as shown and described.

5. An improved sweep comprising oppositely extending wings, a brace plate arranged behind the sweep, a stock and a bolt for securing the plate and sweep thereto, and a lug at the upper end of the plate for engaging a depression in the stock, substantially as shown and described.

In testimony whereof I affix my signature in presence of two witnesses.

JOHN F. REEDER.

Witnesses:
S. A. WHITE,
E. H. MCCLENDON.